United States Patent
McDonnell

(10) Patent No.: US 7,680,453 B2
(45) Date of Patent: Mar. 16, 2010

(54) METHOD OF STORING AND ACCESSING ELECTRONIC DATA AND APPARATUS THEREFOR

(75) Inventor: James Thomas Edward McDonnell, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 950 days.

(21) Appl. No.: 11/095,688

(22) Filed: Apr. 1, 2005

(65) Prior Publication Data

US 2005/0233772 A1 Oct. 20, 2005

(30) Foreign Application Priority Data

Apr. 17, 2004 (GB) .................................. 0408595.7

(51) Int. Cl.
*H04B 5/00* (2006.01)
(52) U.S. Cl. .................. 455/41.1; 455/41.2; 455/550.1; 705/14; 705/26; 705/29
(58) Field of Classification Search ................. 455/502, 455/522; 705/14, 26, 29
See application file for complete search history.

(56) References Cited

U.S. PATENT DOCUMENTS

| 2002/0116268 A1 | 8/2002 | Fukuda |
| 2003/0120745 A1 | 6/2003 | Katagishi et al. |
| 2003/0163724 A1* | 8/2003 | Tayebi et al. ................. 713/200 |
| 2005/0149414 A1* | 7/2005 | Schrodt et al. ................ 705/29 |

FOREIGN PATENT DOCUMENTS

| GB | 2392752 A | 3/2004 |
| JP | 2002-342621 | 11/2002 |
| JP | 2003-198451 | 7/2003 |
| JP | 2003208207 | 7/2003 |

OTHER PUBLICATIONS

Office Action issued to Japanese Patent Application No. 2005-117972, 2 Sheets.

* cited by examiner

*Primary Examiner*—Patrick N Edouard
*Assistant Examiner*—Wayne Cai

(57) ABSTRACT

A method of storing, accessing and displaying electronic data features: storing a first part of the data in a memory tag; storing a second part of the data in a separate location having an address, using a reader, when data is accessed, to couple to the memory tag and access the first part of the data and, while or after the first part of the data is being displayed on a screen, and using a communication unit to link to the address of the separate location and obtain the second part of the data.

16 Claims, 5 Drawing Sheets

METHOD OF STORING AND ACCESSING ELECTRONIC DATA AND APPARATUS THEREFOR

FIELD OF THE INVENTION

The invention relates to a method of storing and accessing electronic data and apparatus therefor.

BACKGROUND OF THE INVENTION

Electronic data is often stored in a central location and accessed over a wireless network. However there can be considerable delays in accessing the data if the link to the central storage location is not already established when the request for the data to be provided is made. This is particularly the case if the data is accessed via the Internet and not simply from another part of a wireless but self contained network.

The present invention seeks to provide an improved method for storing and accessing electronic data, and apparatus for doing so.

SUMMARY OF THE INVENTION

According to a first aspect of the present invention there is provided a method of storing, accessing and displaying electronic data comprising: storing a first part of the data in a memory tag; storing a second part of the data in a separate location having an address, using a reader, when data is accessed, to couple to the memory tag and access the first part of the data and, while or after the first part of the data is being displayed on a screen, and using a communication unit to link to the address of the separate location and obtain the second part of the data.

An advantage of this method over the prior art is that with the first part of the data instantly accessible there is no significant delay between the user requesting access to the data and the display of the data commencing. In many circumstances this will mean the difference between the user losing interest and walking away without seeing the data, and the user seeing it.

Preferably the address of the separate location, at which the second part of the data is stored, is stored in the memory tag with the first part of the data.

Preferably the first part of the data is accessible for display with substantially no delay.

The method may further include displaying the second part of the data on the screen immediately the first part of the data has been displayed, such that the display of the data is continuous.

Alternatively, the method may include making a payment for the second part of the data before it is obtained from the separate location.

Generally the first part of the data is smaller than the second part of the data.

Preferably the reader, screen and communication unit are incorporated into a single display device.

The first part of the data stored in the memory tag may be overwritten with new data when the electronic data to be accessed changes, or the memory tag may be replaced with a new memory tag with the new data stored in it.

According to a second aspect of the invention there is provided an apparatus for the storage, retrieval and display of a set of electronic data having a first part and a second part, the apparatus comprising: a memory tag in which the first part of the data is stored, a main data storage in which the second part of the data is stored, a device operable to access the first part of the data in the memory tag and the second part of the data in the main storage and to display the first part of the data followed by the second part of the data.

Preferably the device which is operable to access and display the data is a portable wireless device.

The main data store may be attached to a WLAN in the vicinity of the memory tag, or may be located distant from the vicinity of the memory tag and is accessed via an initial wireless link.

According to a third aspect of the invention there is provided a structure for electronic data representing a set of information, wherein the electronic data is divided into a first part for display and a second part for display, the first part being adapted for storage in a memory to be placed in a first substantially instantly accessible location and the second part being adapted for storage in a second less readily accessible location such that a delay is experienced in accessing the second part of the data.

Preferably the first location is a memory tag physically accessible to the user and the second location is in a main data store remote from the user.

According to a fourth aspect of the invention there is included providing a service for storage, retrieval and display of a set of electronic data, wherein the set of electronic data has a first part and a second part, the provision of the service including providing the first part of the set of electronic data for storage in a memory tag together with a data network address for accessing the second part of the set of electronic data and in providing the second part of the set of electronic data from the data network address.

The provision of the service may further include providing a device operable to access the first part of the set of electronic data from the memory tag and the second part of the electronic data from the remote storage.

BRIEF DESCRIPTION OF THE DRAWINGS

The method of the invention will now be described, as will an embodiment of apparatus for implementing it, with reference to the accompanying drawings in which.

DETAILED DESCRIPTION OF THE PREFERRED EMBODIMENTS

Figure 1:
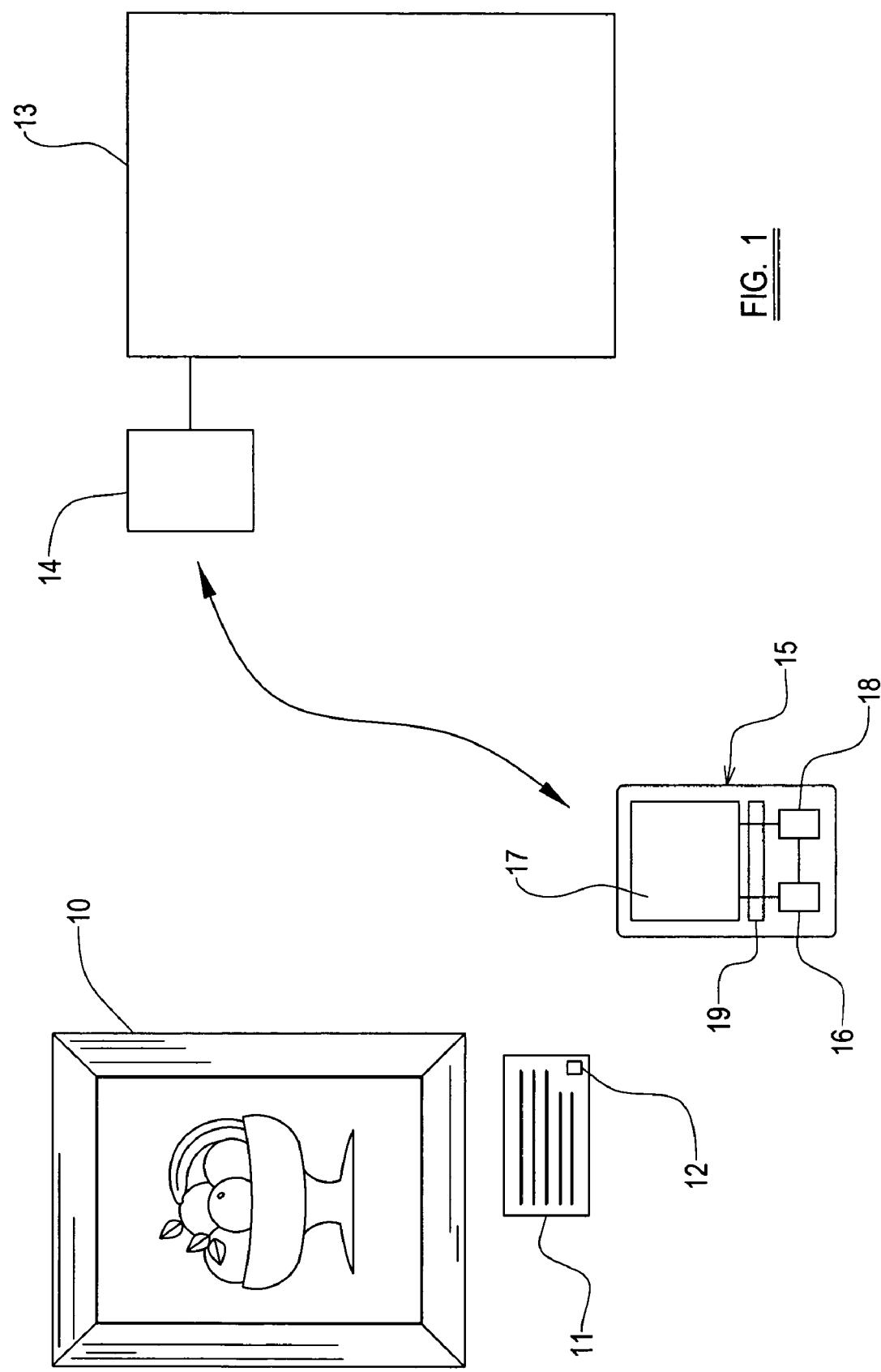
FIG. 1 illustrates the method of storing and accessing electronic data in accordance with the invention.

FIG. 1 illustrates an example of the method of storing and accessing data schematically. A picture 10 is for sale, or simply on view, in a gallery. Adjacent to the picture is a notice 11 providing very brief information about the picture, such as the title, the artist, the medium and when it was painted. On the notice 11 is a memory tag 12.

Figure 2:
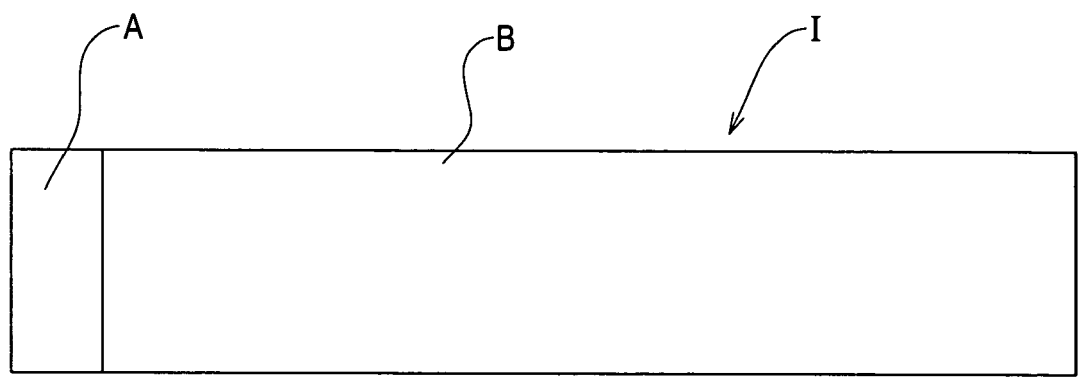
FIG. 2 schematically illustrates the electronic data.

There is much more information available about the picture 10, represented in FIG. 2 as a set of data I. A first relatively small part A of that information I is stored on the memory tag 12, with a second much larger part B of the information I being stored in a main data store 13 which is accessible via nodes 14 of a Wireless Local Area Network (WLAN) in the gallery, i.e. in the vicinity of the memory tag 12. Also stored in the memory tag 12, along with the first part A of the data, is the address of the second larger part of the information.

Someone in the gallery wanting to access the further information about the picture requires a display device 15 which includes a memory tag reader 16, a screen 17, a communication unit 18 and a processor and memory unit 19.

The user holds the display device 15 close to the memory tag 12 such that the memory tag reader 16 within the display device 15 couples to the memory tag 12 and obtains the data stored therein, i.e. the first part A of the information I and the address of the second part B of the information I, and stores it in the processor and memory unit 19. The first part A of the information I is then displayed on the screen 17 of the display device 15 to retain the interest of the user whilst the communication unit 18 connects to the WLAN via the node 14 and obtains the second larger part B of the information I from the main data store 13, using the address of the second part B of the information I as also obtained from the memory tag 12, and stores it also in the processor and memory unit 19. Thus the user does not experience a delay before the information I starts to be displayed on the screen 17, and sees all the information seamlessly as the second part B of the information I is accessed whilst the first part A is being displayed. There is therefore no delay in the user being able to access the information I and their interest in seeing it is not able to wane before the display begins, yet they see all the information I without interruption despite the fact that it far too great a quantity of data to have been stored locally in the memory tag 12.

Figure 5:
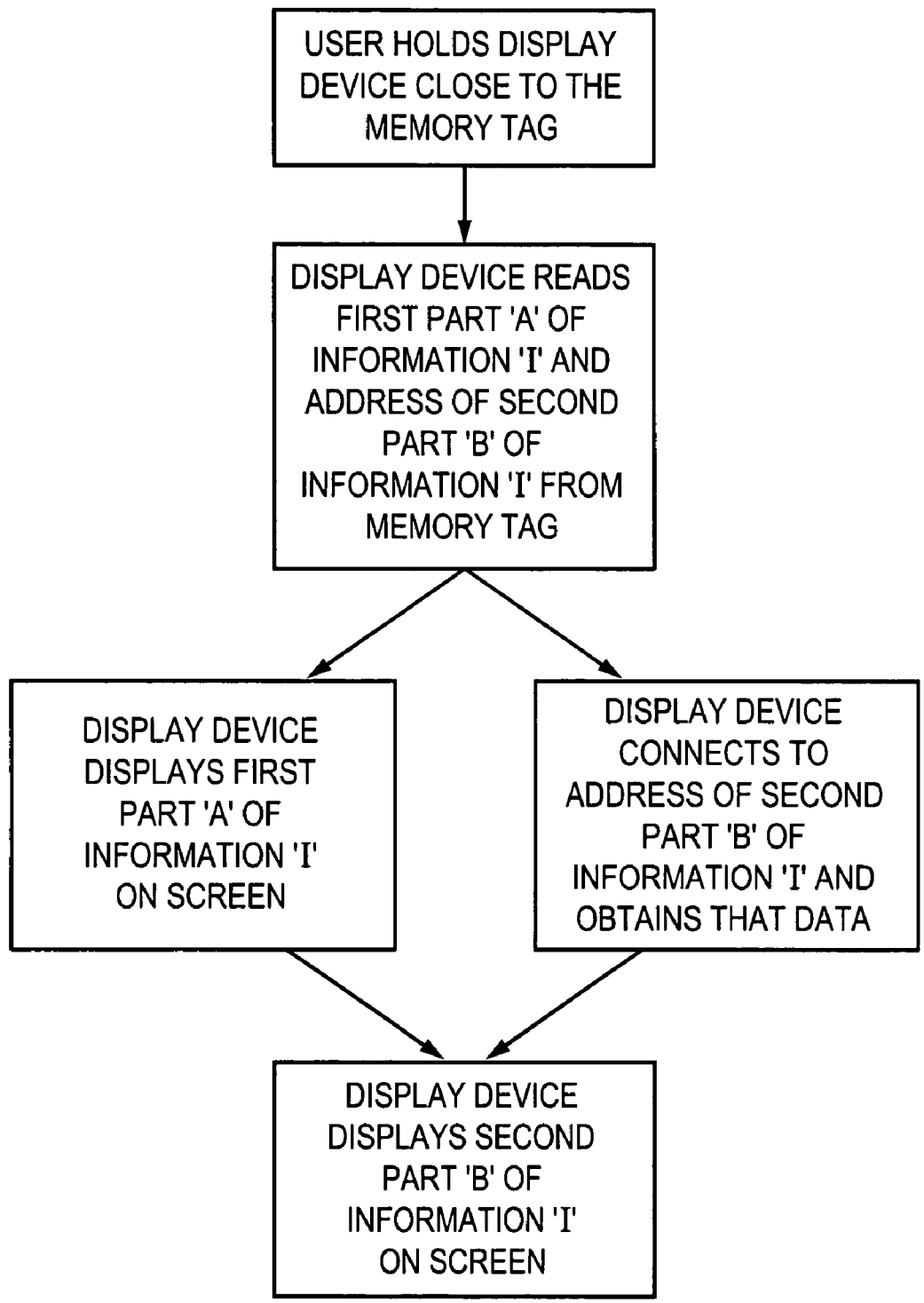
FIG. 5 is a flow chart for a first method according to the invention.

This first method according to the invention is illustrated in the flow chart of FIG. 5.

The memory tag 12 is acting as a buffer in that it contains the initial data (the first part A of the information I) to be displayed, which is displayed whilst the reader is connecting to the main data store 13 to obtain the latter data (the second part B of the information I) using the address obtained along with the first part A of the information. The first part A of the information I must be more than a mere address for the further information or a reference as it must include sufficient data to keep the user amused and interested until such time as the second part B of the information I is available for display.

The data stored in the memory tag 12 is likely in many uses to remain static for relatively long periods of time (days, weeks or even months). When it does require changing either the memory tag 12 may be replaced with a new memory tag 12 with the different data stored within it, or, if the memory tag is of the kind which can be written to as well as read from, the data in the memory tag 12 may be overwritten as required.

The apparatus required to implement this invention, the memory tag 12 and reader 16 within the display device 15, will now be described in more detail.

Memory tags are small devices which include a memory for storage of data and which from which the data is read by wireless communication. Some devices are read only and have data written to them at the time of manufacture which cannot later be altered. Others are read/write devices and they can have data written to them as well as read from them. There are various forms of memory tags known, some of which include a power source whilst others are powered inductively by the reader.

One form of memory tag which is well known is Radio Frequency Identification (RFID) tags. RFID tags come in many forms but all comprise an integrated circuit on which in use data can be stored and a coil which enables it to be interrogated by a reader which also powers it by means of an inductive (wireless) link. The data stored in a memory tag is generally instantly accessible when a reader couples to the memory tag, although systems are known which include security features such that authentication is required before the data becomes available. The present invention will normally make use of the kind of memory tag in which the information is instantly accessible without authentication.

Generally RFID tags of known form are quite large, due to the frequency they operate at (13.56 MHz) and the size of coil they thus require. They also operate over large ranges and have very small storage capacities. Smaller RFID tags have also been developed, operating at various frequencies, but still having small storage capacities. Some RFID tags include Read Only Memory (ROM) and are written to at the time of manufacture, whilst others have read and write capability. RFID tags have tended to be used in quite simple applications, such as for file tracking within offices or in place of or in addition to bar codes for product identification and supply chain management.

Figure 3:
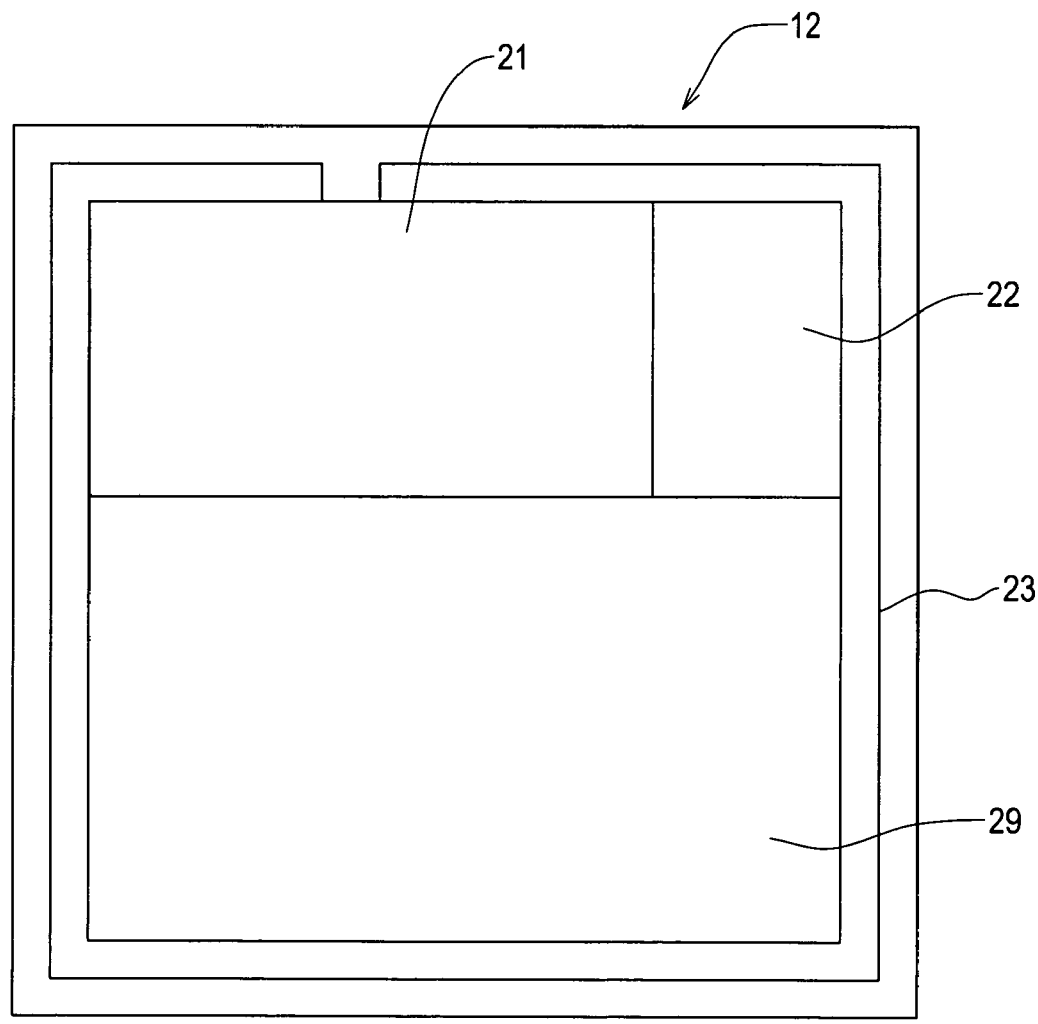
FIG. 3 illustrates an RFID memory tag for use in the method of the invention.

Referring to FIG. 3, a schematic of a memory tag 12 is shown. The memory tag 12 is an RFID memory tag provided on a chip, and comprises an RFID transponder circuit 21, a memory 29, a power supply capacitor 22 and an antenna coil 23 having only a few turns e.g. five, or as in this case a single turn. The RFID transponder circuit 21 operates at 2.45 GHz, is of an area of approximately 0.5 $mm^2$, and will be described further below. The memory 29 provides 1 Mbit of capacity of non-volatile memory and is of an area of approximately 1 $mm^2$, and uses FRAM (ferroelectric random access memory) or MRAM (magnetoresistive random access memory) or similar memory technology requiring low power.

Figure 4:
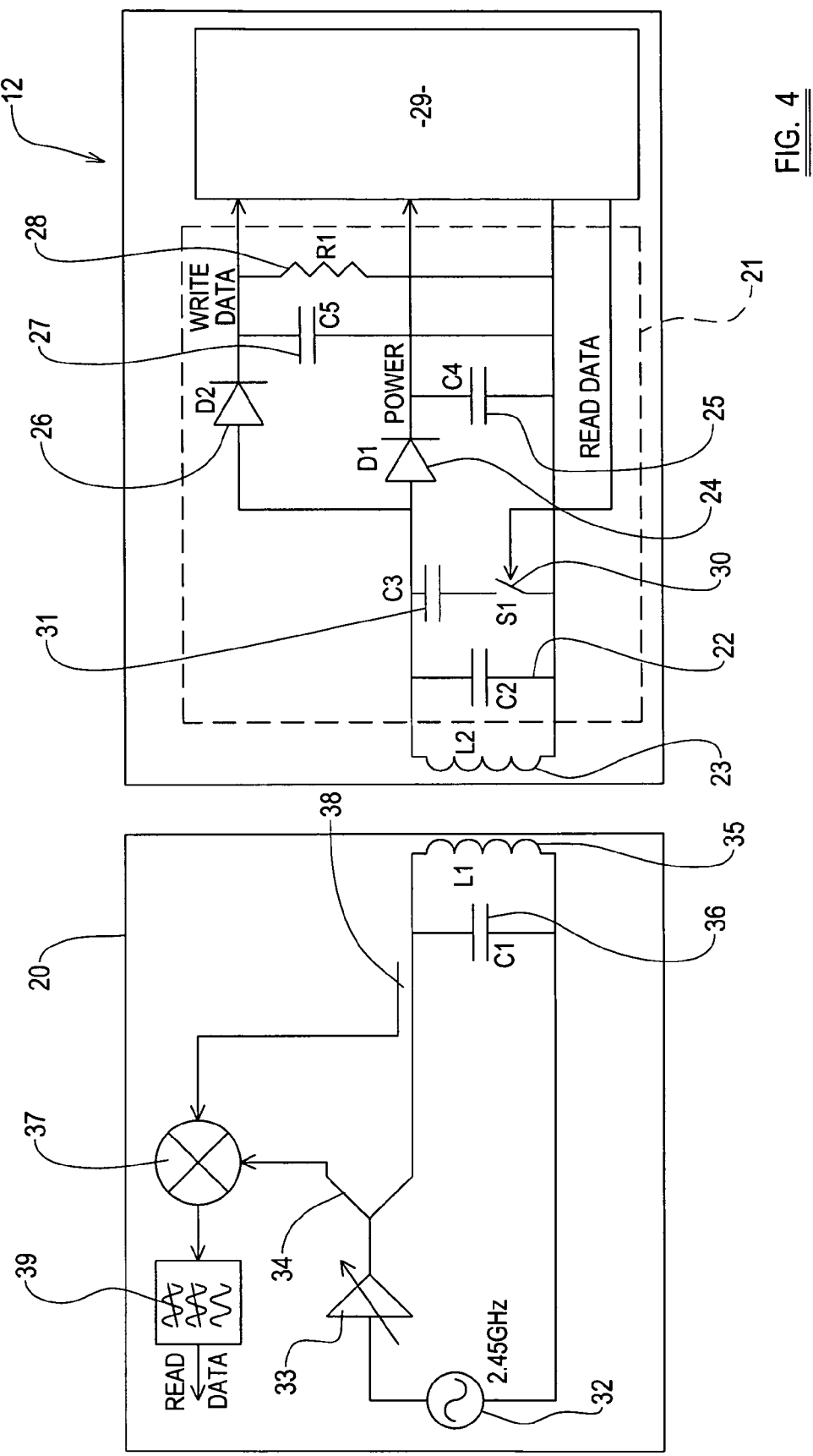
FIG. 4 illustrates the circuitry of the memory tag of FIG. 2 and of a read/write device for wireless communication with the memory tag.

Referring now to FIG. 4, the circuitry of a memory tag 12 and circuitry 20 of the reader 16 are illustrated schematically, using conventional component identifications (C-capacitor, L-inductance, R-resistor, D-diode and S-switch). The memory tag 12 includes an RFID transponder circuit 21 which includes a capacitor C2 (referenced 22) which, in combination with the antenna coil L2 (referenced 23), forms a resonant circuit with component values being chosen to tune the combination to approximately 2.45 GHz for inductive coupling with the reader 16. The portion of transponder circuit 21 responsible for power supply is diode D1 (referenced 24) and capacitor C4 (referenced 25), with diode D1 (24) rectifying the alternating current generated by the inductive coupling and capacitor C4 (25) acting as a power supply storage. The portion of the transponder circuit 21 responsible for receiving transmitted data from the reader 16 is diode D2 (referenced 26), capacitor C5 (referenced 27) and resistor R1 (referenced 28), which form a simple envelope detector; the data thus received is stored in memory 29. The portion of the transponder circuit 21 responsible for the reading of data from the memory 29 is the tuned circuit L2/C2 (22,23) in combination with switch S1 (referenced 30) and capacitor C3 (referenced 31), switching C3 (31) in and out of the circuit using S1 (30) changes the resonance of tuned circuit L2/C2 (22,23) resulting in phase modulation of the reflected power from the memory tag 12 to the reader 16.

The circuit 20 of the reader 16 comprises a signal generator 32 which generates a signal at the chosen frequency of 2.45 GHz. This signal passes via an amplitude modulator 33, where it is amplitude modulated with data to be written to the memory tag 12, and a splitter 34, to an antenna L1 (referenced 35) and capacitor C1 (referenced 36) which form a tuned circuit. The component values of L1 (35) and C1 (36) being chosen to tune it to 2.45 GHz, as for the tuned circuit in the memory tag 12, in order to maximise inductive coupling between the two circuits, and thus transmission of power and data to the memory tag 12.

The splitter 34 takes a part (as much as 50% of the power) of the amplitude modulated signal, for use as a reference signal, and passes it to a multiplier 37. The signal received from the memory tag 12, via the tuned circuit L1/C1 (35,36) and divided from the outgoing signal by a coupler 38, is also passed to the multiplier 37. Thus the transmitted amplitude modulated signal and received signal are multiplied and then pass through a low pass filter 39 to provide a signal comprising the phase modulation from the memory tag 12 and thus indicative of the data read from the memory tag 12. This signal is then passed to the memory 19 of the display device 15, before being displayed at the appropriate time on the screen 17.

One amplitude modulation format which may be used to apply the data to be transmitted to the 2.45 GHz signal is Amplitude Shift Keying (ASK) which only requires the simple envelope detector D2/C5 (26,27) described in the circuit 21. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 21.

With the apparatus of memory tag 12 and reader 16 described above power transfer of around 25% can be achieved with a distance of around 1.8 mm between the antennae L1 (35) and L2 (23), of the reader 16 and memory tag 12 respectively. This is sufficient to transfer enough power to the memory tag 12 for it to operate.

Although the memory tag 12 described above operates at 2.45 GHz it should be understood that memory tags operating at other frequencies may be used to implement the invention. Factors affecting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

The display device 15 may be a device provided by the gallery in which the picture is displayed, specifically to allow people visiting the gallery to obtain further information about the works of art displayed there, or for sale. Alternatively the display device 15 may in fact be a device belonging to the person visiting the gallery, such as a mobile telephone which additionally incorporates a reader 16. Many telephones already include the ability to link to other electronic devices by infra red or Bluetooth and thus the necessary communication unit might be of that form. However the telephone may actually dial to make the necessary connection, for example via the Internet, to obtain the second part B of the information I if it is not retained in a local network such as the WLAN described. In this latter case communication might conveniently be via known communication standards such as GPRS (General Packet Radio Service) or 3G ($3^{rd}$ Generation) mobile links.

There are many other examples of where this invention could be used. For example in shops, for people to obtain further information about items for sale, most likely high value items such as expensive wines, electronic equipment, furniture, holidays and so on. In such retail situations the attention span of a customer tends to be quite short and therefore any delay in displaying the information the user wishes to see might result in them walking off without seeing it and a potential sale may be lost. The first part A of the information I in the memory spot is instantly accessible to capture the potential purchaser's attention whilst the second part B is being accessed, but clearly must include sufficient data of sufficient interest to grab and maintain the potential purchaser's attention. If the system were attempted without the local storage of a first part of the information I, but with just the address for the information I stored in the memory tag 12, the initial set-up time to download the full information I from the infrastructure via wireless connection would in many cases be longer than the attention span of the potential purchaser. The invention captures and holds the customer's attention with the aim of enabling the retailer to make use of the customer's initial purchasing impulse.

Also in shops, short clips from CDs, DVDs and the like might be viewable by potential purchasers. The invention could also be used in estate agents to provide further detail about houses for sale, and the further information could include short video clips which would help potential purchasers appreciate the house more readily and might encourage them to view it.

Preferably the memory spot 12 is one to which data may be written as well as read from, such that the data may be updated as required when the total information I changes and thus the first part A thereof also changes. In order to avoid the data being overwritten accidentally the display device 15 used by general users would not be capable of writing data to the memory tag 12 but only of reading. However, a further device capable of writing to the memory tag 12 would be available to those administering the information system for this purpose. In alternative systems it might be desired that the display devices 15 used by the users could update the memory tag 12, even if it were only to increment a counter to monitor the number of times the memory tag 12 is accessed for the information I.

Clearly the second part B of the information I can be updated as and when required as it is stored in such a manner, in the main data store 13, that updating is always possible by system administrators.

Figure 6:
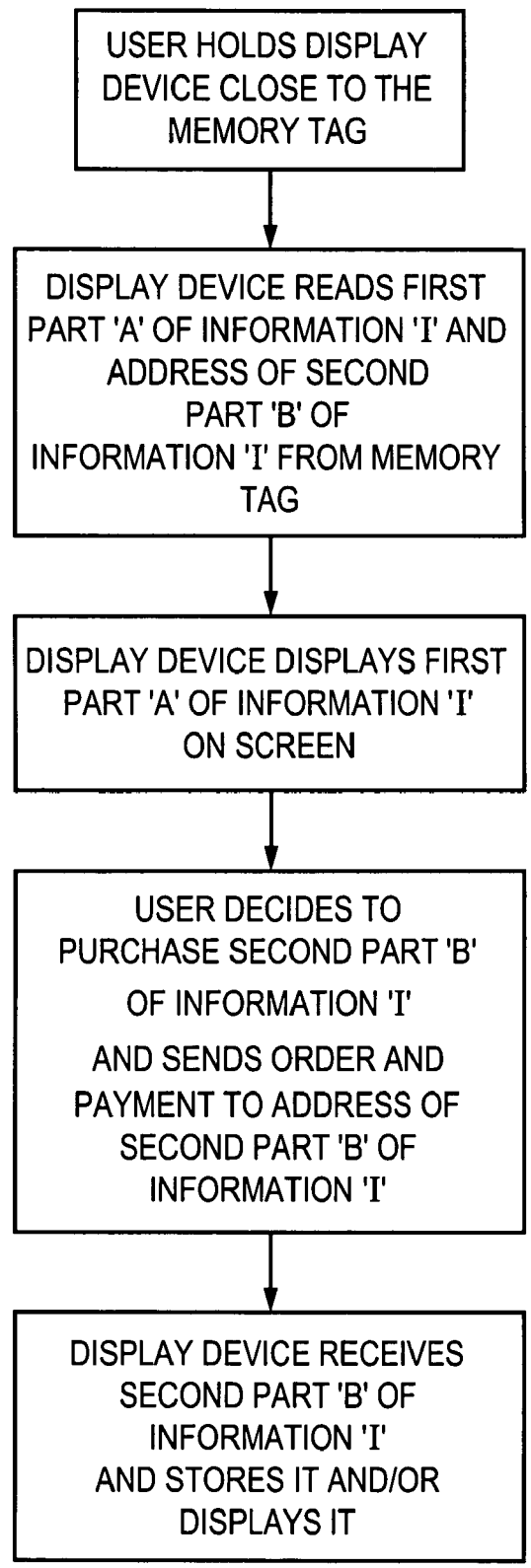
FIG. 6 is a flow chart for a second method according to the invention.

Another way in which this invention can be used commercially is to provide the first part A of the information I to the user without payment as a "taster" of what is to come, but only release the second part B of the information I after the user has made a payment. This second method according to the invention is illustrated in the flow chart of FIG. 6. The apparatus required is still as illustrated in FIG. 1, but in this case when the user has viewed the first part A of the information I they make a decision as to whether or not to purchase the second part B of the information I. If they do decide to purchase the second part B of the information I the communication unit 18 sends an order with payment, such as authority to charge a credit card, to the address of the second part B of the information I, i.e. to the node 14. The second part B of the information I is then retrieved from the main data store 13 and sent from the node 14 to the display device 15. There it may be displayed on the screen 17 and/or stored in the processor and memory unit 19 for future use or display.

This second embodiment has uses in a very wide variety of environments. For example, in a music store the first part A of the information I may be samples from tracks of a music album, with the second part B of the information I being the whole contents of the album. In another example the first part A of the information I might be a trailer for a film or television series and the second part B of the information I might be the whole film or one or more programmes from the television series. In yet another example the first part A of the information I might be picture or map in low resolution and the second part B on the information might be that same picture or map in high resolution.

The invention claimed is:

1. A method of storing, accessing and displaying electronic data comprising:

storing a first part of the electronic data and an address for accessing a second part of the electronic data in a memory tag;

storing the second part of the electronic data in a separate location, said second part of data being associated with the address stored in the memory tag, wherein the separate location is accessible via a Wireless Local Area Network (WLAN), and wherein the separate location is located in a vicinity of the memory tag such that the separate location can be accessed through the WLAN; and making accessible via the memory tag the first part of the electronic data;

making accessible via a communication unit the second part of the electronic data, wherein the second part of the electronic data is accessible from the separate location through the WLAN, wherein the first part of the electronic data is accessible for display with substantially no delay, and the first part of the electronic data is configured to include a sufficient amount of data to be displayed on the screen until the second part of the electronic data is obtained from the separate location, wherein the second part of the electronic data is displayed on the screen substantially immediately after the first part of the data has been displayed, such that the display of the data appears to be substantially continuous.

2. A method according to claim 1, wherein the first part of the electronic data comprises a video clip.

3. A method according to claim 1, wherein a reader, a screen and the communication unit are incorporated into a single display device.

4. A method according to claim 3, wherein the single display device is a mobile telephone.

5. A method according to claim 1, wherein the first part of the electronic data stored in the memory tag is overwritten with new data when the electronic data to be accessed changes.

6. A method according to claim 1, further comprising replacing the memory tag with a new memory tag which stores an amended first part of the electronic data when the electronic data to be accessed changes.

7. A system for the storage, retrieval and display of a set of electronic data having a first part and a second part, the system comprising:

a memory tag in which the first part of the data and an address for accessing the second part of data is stored;

a main data storage in which the second part of the data is stored, said second part of data being associated with the address stored in the memory tag, wherein the main data storage is accessible via a Wireless Local Area Network (WLAN), and wherein the main data storage is located in a vicinity of the memory tag such that the main data storage can be accessed through the WLAN; and a device configured to access the first part of the data in the memory tag and the second part of the data in the main storage, and further configured to display the first part of the data followed by the second part of the data, wherein the first part of the data is accessible for display with substantially no delay, and the first part of the data is configured to include a sufficient amount of data to be displayed on a screen of the device until the second part of the data is obtained from the main data storage, wherein the second part of the electronic data is displayed on the screen substantially immediately after the first part of the data has been displayed, such that the display of the data appears to be substantially continuous.

8. The system according to claim 7, wherein the device which is operable to access and display the data is a portable wireless device.

9. A system according to claim 8, wherein the portable wireless device is a mobile telephone.

10. The system according to claim 7, wherein the the first part of the data comprises a video clip.

11. A structure for electronic data representing a set of information, wherein the electronic data is divided into a first part for display and a second part for display, the first part being adapted for storage in a memory to be placed in a first substantially instantly accessible location, and the second part being adapted for storage in a second less readily accessible location such that a delay is experienced in accessing the second part of the data, wherein the second less readily accessible location is accessible via a Wireless Local Area Network (WLAN), and wherein the second less readily accessible location is located in a vicinity of the first substantially instantly accessible location such that the second less readily accessible location can be accessed through the WLAN, wherein an address for accessing the second part is stored in the first substantially instantly accessible location, wherein the first part is configured to include a sufficient amount of data to be displayed on a screen of a device until the second part is obtained from the second less readily accessible location, wherein the second part of the electronic data is displayed on the screen substantially immediately after the first part of the data has been displayed, such that the display of the data appears to be substantially continuous.

12. A structure for electronic data representing a set of information according to claim 11, wherein the first location is a memory tag physically accessible to a user and the second location is in a main data storage.

13. A structure according to claim 11, wherein the first part comprises a video clip.

14. A device for accessing and displaying electronic data, comprising:

a display;
   a memory tag reader;
   a communication unit; and
   a memory unit, wherein the memory tag reader is configured to receive a first portion of the electronic data and an address from a memory tag and, while or after the first portion of the electronic data is being displayed on the display, use the communication unit to access the address and obtain a second portion of the electronic data, wherein the second portion of the electronic data is accessed from a main data storage accessible via a Wireless Local Area Network (WLAN), and wherein the main data storage is located in a vicinity of the memory tag such that the main data storage can be accessed through the WLAN;

wherein the first portion of the electronic data is displayed with substantially no delay and is displayed for a time period no shorter than the time required to obtain the second portion of the electronic data, wherein the second portion of the electronic data is displayed on the screen substantially immediately after the first portion of the electronic data has been displayed, such that the display of the data appears to be substantially continuous.

15. A device according to claim 14, wherein the device is a mobile telephone.

16. A device according to claim 14, wherein the first portion of the electronic data comprises a video clip.

* * * * *